US012160725B2

(12) United States Patent
Lee et al.

(10) Patent No.: US 12,160,725 B2
(45) Date of Patent: Dec. 3, 2024

(54) DOUBLE-SIDED LOUDSPEAKER

(71) Applicant: FORTUNE GRAND TECHNOLOGY INC., Taoyuan (TW)

(72) Inventors: Ping-Yu Lee, Taoyuan (TW); De-Wu Wang, Taoyuan (TW); Zhi-Long Niu, Taoyuan (TW); Yu-Hsi Chen, Taoyuan (TW)

(73) Assignee: FORTUNE GRAND TECHNOLOGY INC., Taoyuan (TW)

( * ) Notice: Subject to any disclaimer, the term of this patent is extended or adjusted under 35 U.S.C. 154(b) by 204 days.

(21) Appl. No.: 18/079,902

(22) Filed: Dec. 13, 2022

(65) Prior Publication Data

US 2024/0089666 A1 Mar. 14, 2024

(30) Foreign Application Priority Data

Sep. 13, 2022 (CN) ......................... 202211109935.4

(51) Int. Cl.

| | |
|---|---|
| ***H04R 9/06*** | (2006.01) |
| ***H04R 7/04*** | (2006.01) |
| ***H04R 9/02*** | (2006.01) |
| ***H04R 9/04*** | (2006.01) |

(52) U.S. Cl.
CPC ............... *H04R 9/063* (2013.01); *H04R 7/04* (2013.01); *H04R 9/025* (2013.01); *H04R 9/046* (2013.01)

(58) Field of Classification Search
CPC .......... H04R 9/063; H04R 7/04; H04R 9/025; H04R 9/046
See application file for complete search history.

(56) References Cited

U.S. PATENT DOCUMENTS

2020/0288249 A1* 9/2020 Shao ...................... H04R 7/127
2022/0159384 A1* 5/2022 Han ....................... H04R 9/046
2022/0360903 A1* 11/2022 Huang ................... H04R 9/025

FOREIGN PATENT DOCUMENTS

CN 109511061 A * 3/2019 ............ H04R 9/025

OTHER PUBLICATIONS

Translation of CN109511061A (Year: 2019).*

* cited by examiner

*Primary Examiner* — Andrew Sniezek

(57) ABSTRACT

A double-sided loudspeaker includes a first speaker base and a second speaker base assembled with each other and provided with a ventilation hole; a first side magnetic plate injection molded at the first speaker base or the second speaker base; a second side magnetic plate injection molded at the first speaker base or the second speaker base; a magnetic member disposed between the first side magnetic plate and the second side magnetic plate and including a main magnetic plate, a first magnetic unit and a second magnetic unit; a first diaphragm disposed at the first speaker base; a first voice coil disposed at the first diaphragm and movably arranged at the first magnetic unit; a second diaphragm disposed at the second speaker base; and a second voice coil disposed at the second diaphragm and movably arranged at the second magnetic unit.

6 Claims, 19 Drawing Sheets

10

DOUBLE-SIDED LOUDSPEAKER

CROSS-REFERENCE TO RELATED APPLICATION

This non-provisional application claims priority under 35 U.S.C. § 119(a) on Patent Application No(s). 202211109935.4 filed in China on Sep. 13, 2022, the entire contents of which are hereby incorporated by reference.

BACKGROUND OF THE INVENTION

1. Field of the Invention

The present disclosure relates to a double-sided loudspeaker, and in particular to a double-sided loudspeaker with an improved yield rate and reduced assembly hours and costs.

2. Description of the Related Art

A common double-sided speaker is usually assembled with a magnetic member and then fixed to upper and lower speaker bases. The upper and lower speaker bases are then coupled with each other to complete the assembly of the loudspeaker.

Thus, for a common double-sided loudspeaker, the magnetic member and side magnetic plates on two sides need to be first assembled and then fixed onto the upper and lower speaker bases, such that the assembly of the magnetic member and the side magnetic plates results in increased assembly processes and hours as well as issues in the assembly yield rate and costs.

Therefore, the present disclosure aims at disclosing a double-sided loudspeaker that achieves an integral structure of a first side magnetic plate, a second side magnetic plate, a first speaker base and a second speaker base formed by means of injection molding, thereby enhancing an assembly yield rate and reducing assembly hours and costs.

BRIEF SUMMARY OF THE INVENTION

In view of the above drawbacks of the prior art, with extensive research and development to overcome these drawbacks, the applicant provides a double-sided loudspeaker that achieves an integral structure of a first side magnetic plate, a second side magnetic plate, a first speaker base and a second speaker base formed by means of injection molding, thereby enhancing an assembly yield rate and reducing assembly hours and costs.

To achieve the above and other objects, the present disclosure provides a double-sided loudspeaker including a first speaker base, a second speaker base, at least a first side magnetic plate, at least a second side magnetic plate, a magnetic member, a first diaphragm, a first voice coil, a second diaphragm and a second voice coil. The first speaker base and the second speaker base are assembled with each other and are provided with at least one ventilation hole in between. The first side magnetic plate is injection molded at the first speaker base or the second speaker base. The second side magnetic plate is injection molded at the first speaker base or the second speaker base. The magnetic member is disposed between the first side magnetic plate and the second side magnetic plate, and includes a main magnetic plate, a first magnetic unit and a second magnetic unit. The first magnetic unit is disposed on a surface of the main magnetic plate, and the second magnetic unit is disposed on another surface of the main magnetic plate. The first diaphragm is disposed at the first speaker base. The first voice coil is disposed at the first diaphragm and is movably arranged at the first magnetic unit. The second diaphragm is disposed at the second speaker base. The second voice coil is disposed at the second diaphragm and is movably arranged at the second magnetic unit.

In the above double-sided loudspeaker, the first speaker base is provided with a plurality of assembly portions, the second speaker base is provided with a plurality of counterpart assembly portions, and the assembly portions are assembled with the counterpart assembly portions.

In the above double-sided loudspeaker, each of two sides of the first speaker base is provided with a first lengthwise portion, each of two ends of the first speaker base is provided with a first widthwise portion, each of two sides of the second speaker base is provided with a second lengthwise portion, each of two ends of the second speaker base is provided with a second widthwise portion, the first lengthwise portions are respectively assembled with the second lengthwise portions, and the first widthwise portions are respectively assembled with the second widthwise portions.

In the above double-sided loudspeaker, the first side magnetic plate and the second side magnetic plate are respectively disposed at the first lengthwise portions, the first side magnetic plate and the second side magnetic plate individually extend out of the first speaker base, the first side magnetic plate and the second side magnetic plate are respectively assembled to the second lengthwise portions, the main magnetic plate is directly fixed between the first speaker base and the second speaker base, and the first side magnetic plate and the second side magnetic plate are located on two sides of the main magnetic plate.

In the above double-sided loudspeaker, a thickness and a volume of the first speaker base are respectively greater than a thickness and a volume of the second speaker base.

In the above double-sided loudspeaker, the first lengthwise portions are respectively provided with the first side magnetic plates, the second lengthwise portions are respectively provided with the second side magnetic plates, the first side magnetic plates respectively correspond to the second side magnetic plates, and the first side magnetic plates and the second side magnetic plates respectively clamp on two sides of the main magnetic plate.

In the above double-sided loudspeaker, each of four end portions between the first speaker base and the second speaker base includes a limiting portion to fix the main magnetic plate.

In the above double-sided loudspeaker, the first side magnetic plates extend into the limiting portions to attach by attraction to the main magnetic plate.

In the above double-sided loudspeaker, the first lengthwise portions are respectively provided with the first side magnetic plates, the second lengthwise portions are respectively provided with the second side magnetic plates, the first side magnetic plates respectively correspond to the second side magnetic plates, and two sides of the main magnetic plate are located between the first side magnetic plates and the second side magnetic plates.

In the above double-sided loudspeaker, each of four end portions between the first speaker base and the second speaker base includes a recessed limiting portion, each of four end portions of the main magnetic plate includes a protruding positioning portion, and the positioning portions are respectively disposed at the limiting portions.

In the above double-sided loudspeaker, the first side magnetic plates and the second side magnetic plates do not extend into the limiting portions.

In the above double-sided loudspeaker, the first lengthwise portions are respectively provided with the first side magnetic plates, one of the first side magnetic plates extends out of the first speaker base, the second lengthwise portions are respectively provided with the second side magnetic plates, one of the second side magnetic plates extends out of the second speaker base, and the first side magnetic plates are respectively correspondingly assembled at the second side magnetic plates.

In the above double-sided loudspeaker, the first side magnetic plate and the second side magnetic plate are respectively disposed at the first lengthwise portions, each of two sides of the main magnetic plate is provided with a bending side portion, and the bending side portions bend toward a same direction and are respectively assembled at the second lengthwise portions.

In the above double-sided loudspeaker, the first side magnetic plate is disposed at one of the first widthwise portions, the second side magnetic plate is disposed at one of the second widthwise portions, each of two ends of the main magnetic plate is provided with a bending end portion, and the bending end portions bend toward different directions and are respectively assembled at the other first widthwise portion and the other second widthwise portion.

In the above double-sided loudspeaker, the first side magnetic plate and the second side magnetic plate are respectively disposed at the first widthwise portions, each of two ends of the main magnetic plate is provided with a bending end portion, and the bending end portions bend toward a same direction and are respectively assembled at the second widthwise portions.

In the above double-sided loudspeaker, a cross section of the main magnetic plate, the first side magnetic plate and the second side magnetic plate appears as an H shape.

In the above double-sided loudspeaker, each of the first side magnetic plate, the second side magnetic plate and the main magnetic plate is provided with an indentation in communication with the ventilation holes.

In the above double-sided loudspeaker, the main magnetic plate is provided with a plurality of protruding positioning portions, the first speaker base or the second speaker base is provided with a plurality of recessed limiting portions, and the positioning portions are respectively coupled to the limiting portions such that the main magnetic plate is disposed between the first speaker base and the second speaker base.

Accordingly, the double-sided loudspeaker of the present disclosure achieves an integral structure of the first side magnetic plate, the second side magnetic plate, the first speaker base and the second speaker base formed by means of injection molding, thereby enhancing an assembly yield rate and reducing assembly hours and costs.

DETAILED DESCRIPTION OF THE INVENTION

Figure 1:
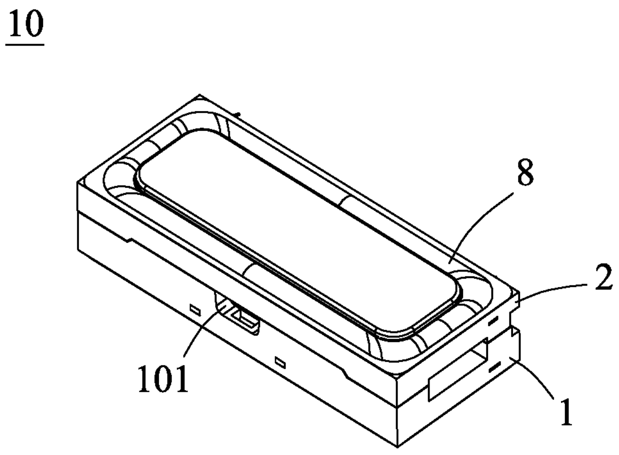
FIG. 1 is a schematic diagram of an appearance of a double-sided loudspeaker according to a first embodiment of the present disclosure.
Figure 2:
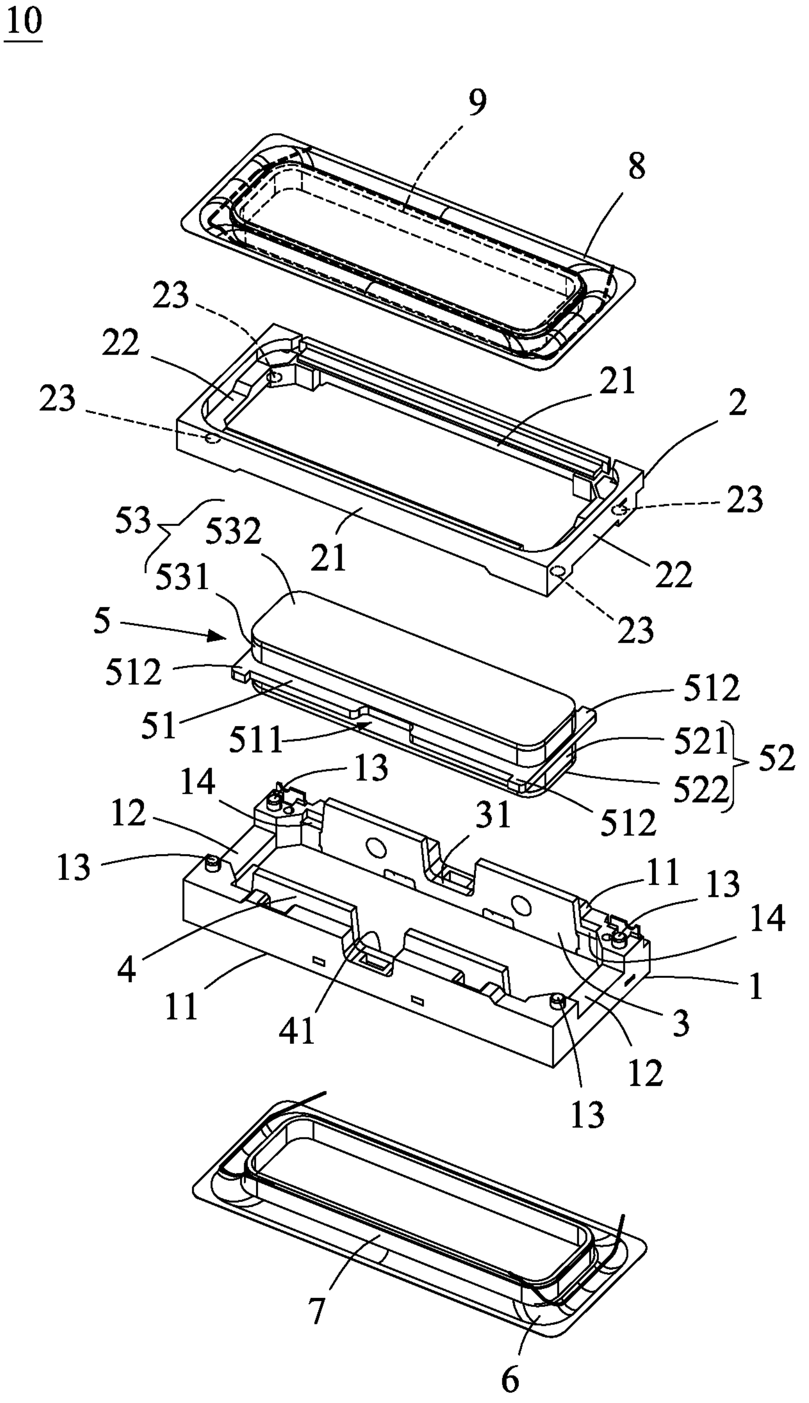
FIG. 2 is a first exploded schematic diagram of a double-sided loudspeaker according to the first embodiment of the present disclosure.
Figure 3:
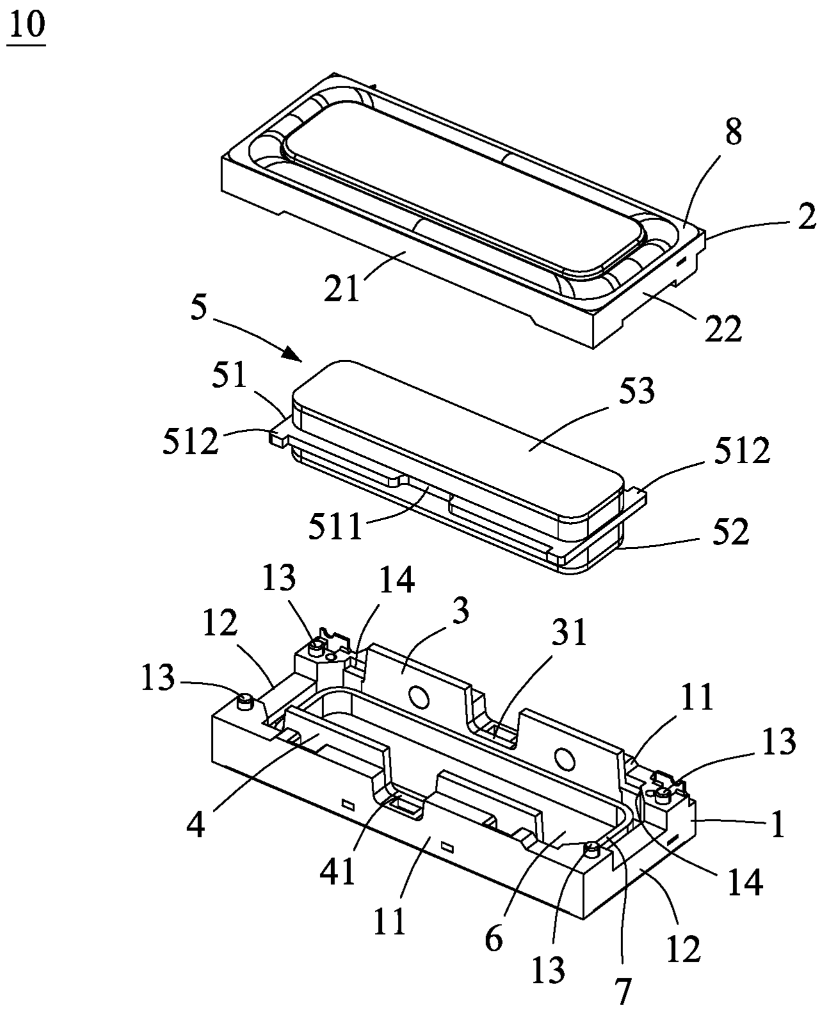
FIG. 3 is a second exploded schematic diagram of a double-sided loudspeaker according to the first embodiment of the present disclosure.
Figure 4:
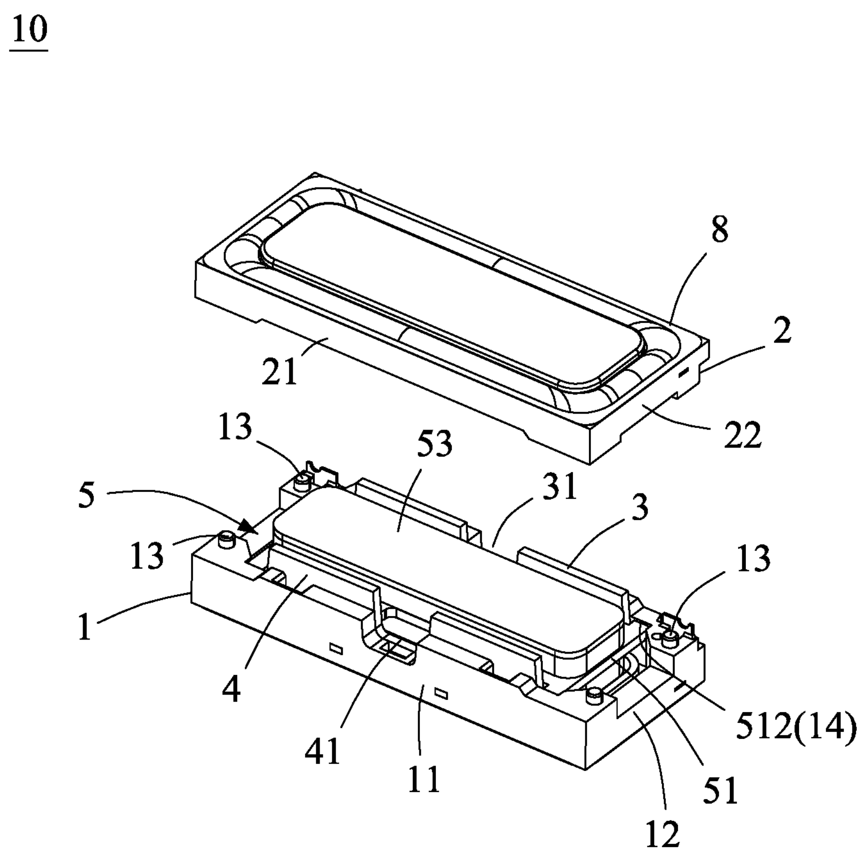
FIG. 4 is a third exploded schematic diagram of a double-sided loudspeaker according to the first embodiment of the present disclosure.

To facilitate understanding of the object, characteristics and effects of the present disclosure, embodiments together with the attached drawings for the detailed description of the present disclosure are provided below.

Refer to FIG. 1 to FIG. 5. As shown in the drawings, the present disclosure provides a double-sided loudspeaker 10, which includes a first speaker base 1, a second speaker base 2, at least one first side magnetic plate 3, at least one second side magnetic plate 4, a magnetic member 5, a first diaphragm 6, a first voice coil 7, a second diaphragm 8 and a second voice coil 9.

The second speaker base 2 is assembled with the first speaker base 1, and the first speaker base 1 and the second speaker base 2 are provided with at least one ventilation hole 101 in between.

The first side magnetic plate 3 may be injection molded in the first speaker base 1 or in the second speaker base 2 to form an integral structure. In this embodiment, the first side magnetic plate 3 is injection molded in the first speaker base 1 as an example.

The second side magnetic plate 4 may be injection molded in the first speaker base 1 or in the second speaker base 2 to form an integral structure. In this embodiment, the second side magnetic plate 4 is injection molded in the first speaker base 1 as an example.

The magnetic member 5 is disposed between the first side magnetic plate 3 and the second side magnetic plate 4, and includes a main magnetic plate 51, a first magnetic unit 52 and a second magnetic unit 53. The first magnetic unit 52 is disposed on a surface (for example, a bottom surface) of the main magnetic plate 51, and the second magnetic unit 53 is disposed on another surface (for example, a top surface) of the main magnetic plate 51. Moreover, the first magnetic unit 52 may include a first magnet 521 and a first magnetic plate 522, and the second magnetic unit 53 may include a second magnet 531 and a second magnetic plate 532. The first magnet 521 may be disposed on a surface (for example, a bottom surface) of the main magnetic plate 51, and the first magnetic plate 522 is disposed at the first magnetic 521. The second magnet 531 may be disposed on another surface (for example, a top surface) of the main magnetic plate 51, and the second magnetic plate 532 is disposed at the second magnetic 531. Thus, the double-sided loudspeaker 10 of the present disclosure enables the first magnetic unit 52 and the second magnetic unit 53 to form two completely independent upper and lower magnetic fields.

The first diaphragm 6 is disposed at the first speaker base 1.

The first voice coil 7 is disposed at the first diaphragm 6 and movably arranged at the first magnetic unit 52.

The second diaphragm 8 is disposed at the second speaker base 2.

The second voice coil 9 is disposed at the second diaphragm 8 and movably arranged at the second magnetic unit 53.

Accordingly, the double-sided loudspeaker 10 of the present disclosure achieves an integral structure of the first side magnetic plate 3, the second side magnetic plate 4, the first speaker base 1 and the second speaker base 2 formed by means of injection molding, thereby enhancing an assembly yield rate and reducing assembly hours and costs.

Refer to FIG. 1 to FIG. 4. As shown in the drawings, in one embodiment of the present disclosure, each of two sides of the first speaker base 1 may be provided with a first lengthwise portion 11, and each of two ends of the first speaker base 1 may be provided with a first widthwise portion 12, such that the first speaker base 1 appears rectangular in shape. Moreover, each of two sides of the second speaker base 2 may be provided with a second lengthwise portion 21, and each of two ends of the second speaker base 2 may be provided with a second widthwise portion 22, such that the second speaker base 2 appears rectangular in shape. The first lengthwise portions 11 are respectively assembled at the second lengthwise portions 21, and the first widthwise portions 12 are respectively assembled at the second widthwise portions 22. Further, the magnetic member 5, the first diaphragm 6, the first voice coil 7, the second diaphragm 8 and the second voice coil 9 may also appear rectangular in shape. Thus, the double-sided loudspeaker 10 of the present disclosure appears rectangular in shape and is suitable for rectangular electronic devices.

Figure 5:
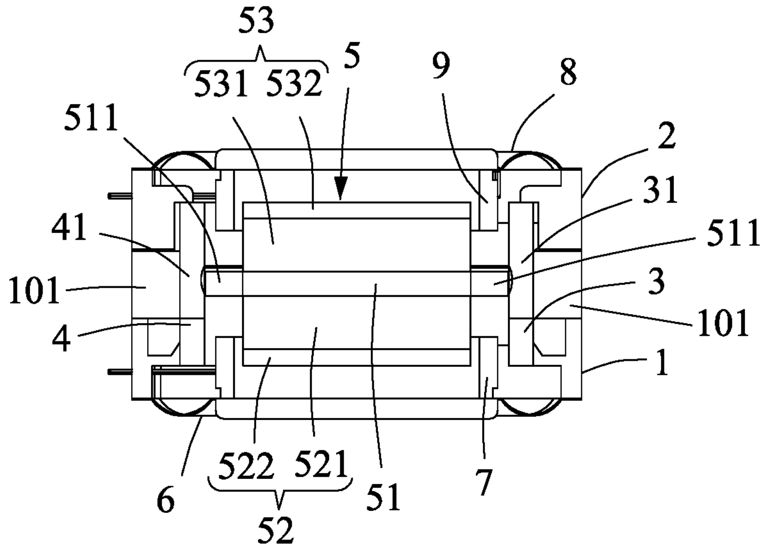
FIG. 5 is a cross-sectional schematic diagram of a double-sided loudspeaker according to the first embodiment of the present disclosure.

Refer to FIG. 1 to FIG. 5. As shown in the drawings, in one embodiment of the present disclosure, the first side magnetic plate 3 and the second side magnetic plate 4 may be respectively injection molded in the first lengthwise portions 11, and the first side magnetic plate 3 and the second side magnetic plate 4 may individually extend out of the first speaker base 1, such that the first side magnetic plate 3 and the second side magnetic plate 4 are respectively assembled to the second lengthwise portions 21, and the first side magnetic plate 3 and the second side magnetic plate 4 are located on two sides of the main magnetic plate 51. Moreover, protruding positioning portions 512 at four end portions of the main magnetic plate 51 can be directly fixed at recessed limiting portions 14 (two limiting portions 14 not shown in the drawings are located on the first lengthwise portion 11 opposite to the two limiting portions 14 in the drawings) at four end portions between the first speaker base 1 and the second speaker base 2, such that the main magnetic plate 51 is not in contact with or is in contact with the first side magnetic plate 3 and the second side magnetic plate 4. Moreover, as shown in FIG. 5, a cross section of the main magnetic plate 51, the first side magnetic plate 3 and the second side magnetic plate 4 in the widthwise direction of the main magnetic plate 51 appears as an H-shaped arrangement. Accordingly, with the integral structure of the first side magnetic plate 3, the second side magnetic plate 4, the first speaker base 1 and the second speaker base 2 formed by means of injection molding, the magnetic member 5 no longer needs to be assembled at the first speaker base 1 and the second speaker base 2 through the first side magnetic plate 3 and the second side magnetic plate 4, thereby enhancing an assembly yield rate of the double-sided loudspeaker 10 and reducing assembly hours and costs of the double-sided loudspeaker 10.

In addition, the thickness and the volume of the first speaker base 1 may be respectively greater than the thickness and the volume of the second speaker base 2, so as to reinforce the first side magnetic plate 3 and the second side magnetic plate 4 injection molded and coupled to the first speaker base 1.

The double-sided loudspeaker 10 of the present disclosure in use can combine with a speaker enclosure (not shown), such that the first diaphragm 6, the first voice coil 7, the first magnetic unit 52, the second diaphragm 8, the second voice coil 9 and the second magnetic unit 53 are disposed in a top-down symmetrical arrangement on two surfaces of the main magnetic plate 51 and hence share the main magnetic plate 51, further forming two completely independent upper and lower magnetic fields to facilitate operations through electromagnetic effects.

During operations, once the first voice coil 7 and the second voice coil 9 receive externally input electronic signals, the first diaphragm 6 and the second diaphragm 8 simultaneously act outward and simultaneously act inward. The first diaphragm 6 and the second diaphragm 8 push air for vibrations and generate sounds when both act outward. When both of the first diaphragm 6 and the second diaphragm 8 act inward, the two forces of action are counteracted through the ventilation hole 101 to achieve shock absorption, further preventing the forces of action generated by the first diaphragm 6 and the second diaphragm 8 from driving and vibrating the whole double-sided loudspeaker 10.

Refer to FIG. 1 to FIG. 4. As shown in the drawings, in one embodiment of the present disclosure, the first speaker base 1 may be provided with a plurality of assembly portions 13 (for example, protruding columns or recessed holes), and the second speaker base 2 may be provided with a plurality of counterpart assembly portions 23 (for example, recessed holes or protruding columns). The assembly portions 13 are respectively assembled with the counterpart assembly portions 23, enabling the first speaker base 1 and the second speaker base 2 to be stably assembled with each other.

Refer to FIG. 1 to FIG. 5. As shown in the drawings, in one embodiment of the present disclosure, the first side magnetic plate 3, the second side magnetic plate 4 and the main magnetic plate 51 are respectively provided with indentation s 31, 41 and 511 in communication with the ventilation holes 101. As such, when both of the first diaphragm 6 and the second diaphragm 8 act inward, the two forces of action are counteracted through the indentations 31, 41 and 511 coordinating with the ventilation holes 101, thereby achieving shock absorption.

Refer to FIG. 1 to FIG. 5. As shown in the drawings, in one embodiment of the present disclosure, the main magnetic plate 51 may be provided with a plurality of protruding positioning portions 512, the first speaker base 1 (or the second speaker base 2) may be provided with a plurality of recessed limiting portions 14, and the positioning portions 512 are respectively coupled to the limiting portions 14 such that the main magnetic plate 51 is stably disposed between the first speaker base 1 and the second speaker base 2.

Figure 6:
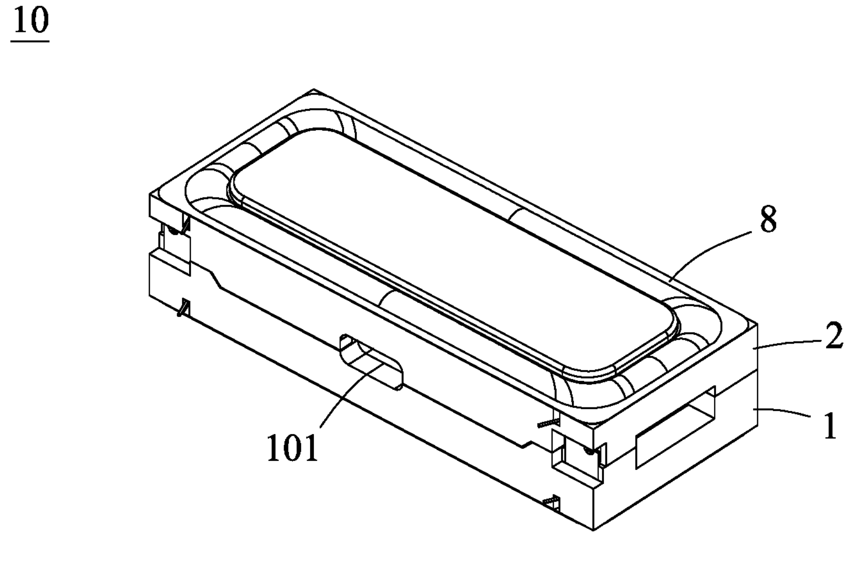
FIG. 6 is a schematic diagram of an appearance of a double-sided loudspeaker according to a second embodiment of the present disclosure.
Figure 7:
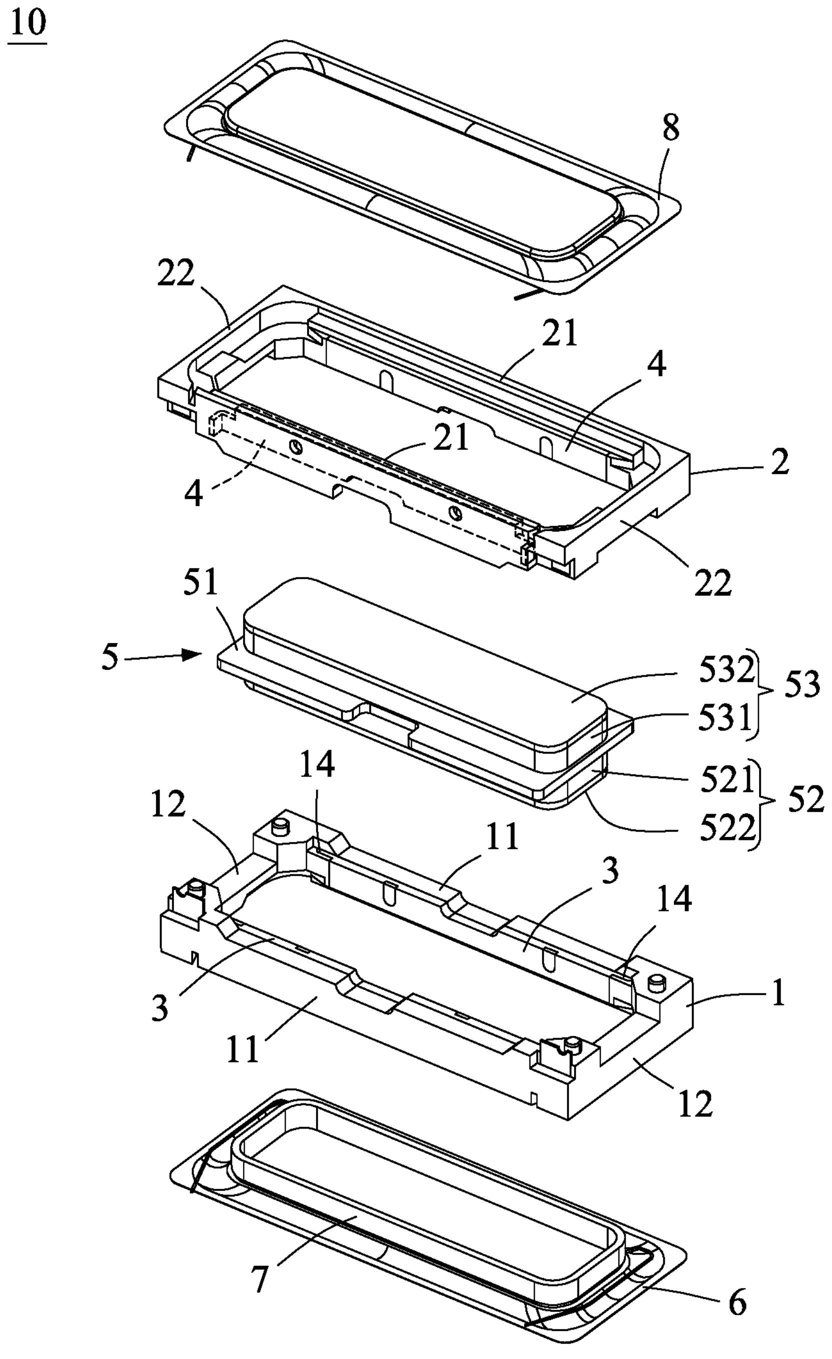
FIG. 7 is an exploded schematic diagram of a double-sided loudspeaker according to the second embodiment of the present disclosure.
Figure 8:
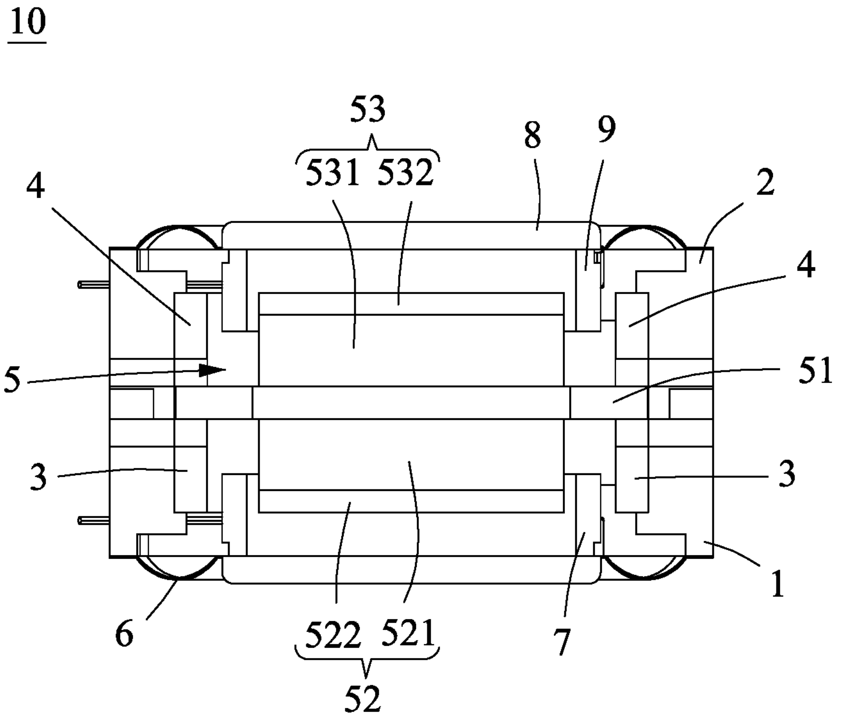
FIG. 8 is a cross-sectional schematic diagram of a double-sided loudspeaker according to the second embodiment of the present disclosure.

Refer to FIG. 6 to FIG. 8. As shown in the drawings, in addition to the above embodiments, in one embodiment of the present disclosure, the first lengthwise portions 11 of the first speaker base 1 are respectively provided with the first side magnetic plates 3 by injection molding, the second lengthwise portions 21 of the second speaker base 2 are respectively provided with the second side magnetic plates 4 by injection molding, the first side magnetic plates 3 respectively correspond to the second side magnetic plates 4, and the first side magnetic plates 3 and the second side magnetic plates 4 respectively clamp on two sides of the main magnetic plate 51. Accordingly, the first side magnetic plate 3, the second side magnetic plate 4, the first speaker base 1 and the second speaker base 2 achieve an integral structure by means of injection molding, thereby enhancing an assembly yield rate of the double-sided loudspeaker 10 and reducing assembly hours and costs of the double-sided loudspeaker 10. Moreover, as shown in FIG. 8, a cross section of the main magnetic plate 51, the first side magnetic plates 3 and the second side magnetic plates 4 in the widthwise direction of the main magnetic plate 51 may appear as an H-shaped arrangement.

Refer to FIG. 6 to FIG. 8. As shown in the drawings, a recessed limiting portion 14 is provided at each of four end portions between the first speaker base 1 and the second speaker base 2 to fix each of four end portions of the main magnetic plate 51, and the first side magnetic plates 3 may extend into the limiting portions 14 to attach by attraction to the main magnetic plate 51. Thus, the main magnetic plate 51 can be directly fixed between the first speaker base 1 and the second speaker base 2, and can be further attached by attraction between the first speaker base 1 and the second speaker base 2 by the force of attraction of the first side magnetic plates 3 and the force of attraction of the second side magnetic plates 4, thereby reinforcing the coupling strength without involving additional gluing or providing fastening structures. In addition, the main magnetic plate 51 of the magnetic member 5 can be first assembled at the first speaker base 1 and then be assembled at the second speaker base 2, so as to enhance ease of assembly. Moreover, in the double-sided loudspeaker 10 shown in FIG. 1 to FIG. 5, the first side magnetic plate 3 and the second side magnetic plate 4 may also extend into the limiting portions 14 of the first speaker base 1 to enhance ease of assembly.

Figure 9:
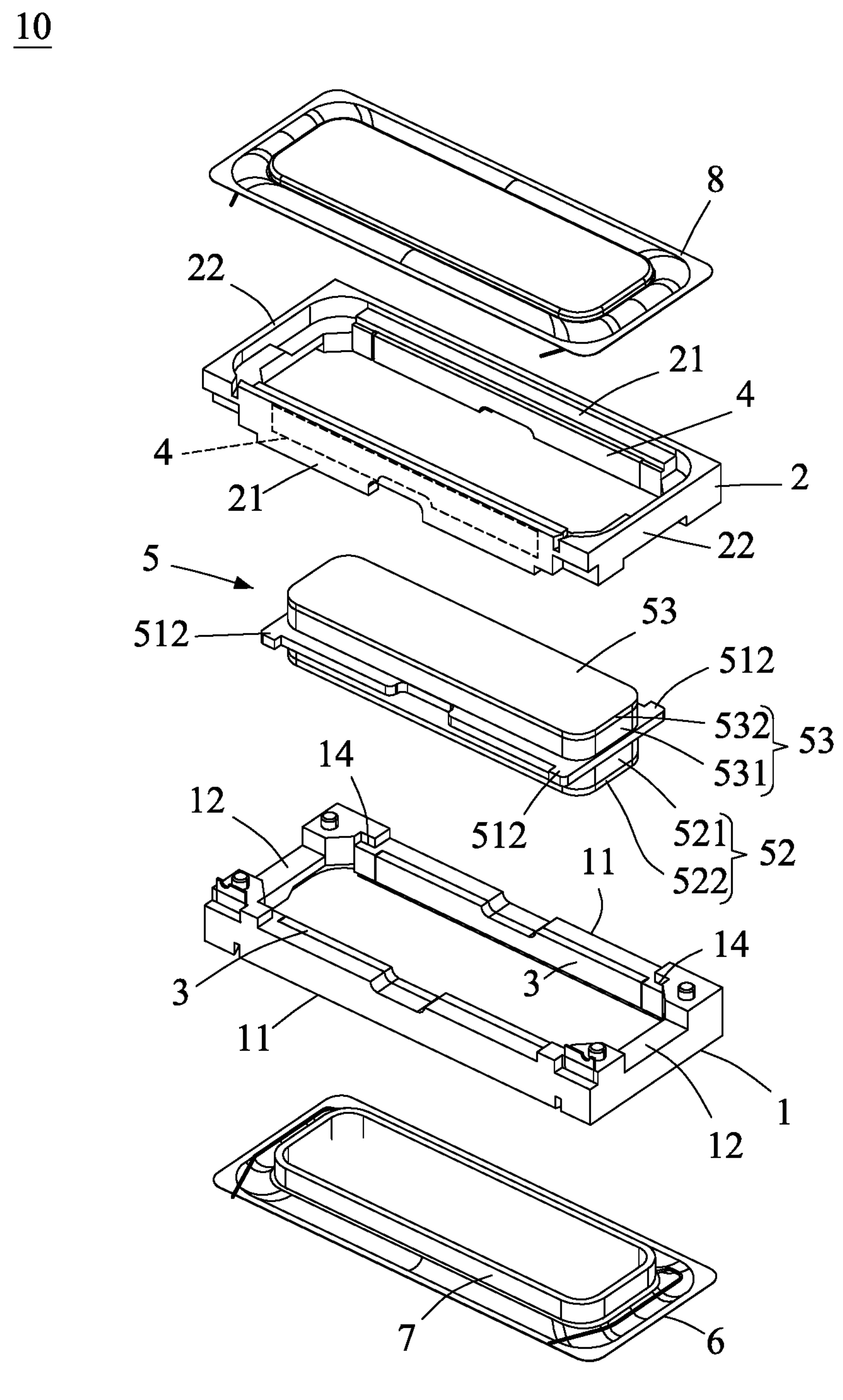
FIG. 9 is an exploded schematic diagram of a double-sided loudspeaker according to a third embodiment of the present disclosure.
Figure 10:
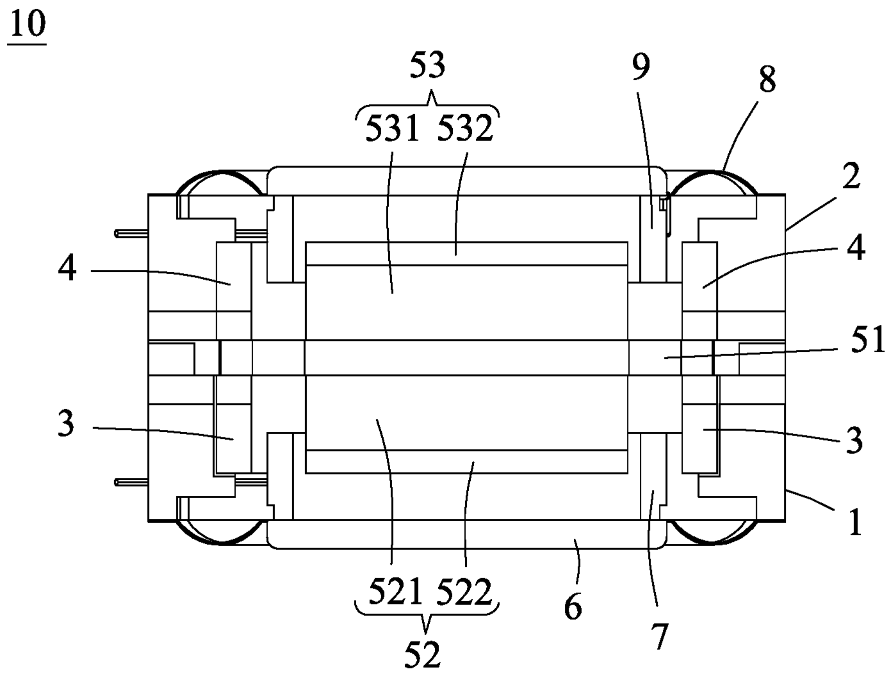
FIG. 10 is a cross-sectional schematic diagram of a double-sided loudspeaker according to the third embodiment of the present disclosure.

Refer to FIG. 9 and FIG. 10. As shown in the drawings, in addition to the above embodiments, in one embodiment of the present disclosure, the first lengthwise portions 11 of the first speaker base 1 may be respectively provided with the first side magnetic plates 3 by injection molding, the second lengthwise portions 21 of the second speaker base 2 may be respectively provided with the second side magnetic plates 4 by injection molding, the first side magnetic plates 3 respectively correspond to the second side magnetic plates 4, and two sides of the main magnetic plate 51 are located between the first side magnetic plates 3 and the second side magnetic plates 4. Accordingly, the first side magnetic plate 3, the second side magnetic plate 4, the first speaker base 1 and the second speaker base 2 achieve an integral structure by means of injection molding, thereby enhancing an assembly yield rate of the double-sided loudspeaker 10 and reducing assembly hours and costs of the double-sided loudspeaker 10. Moreover, as shown in FIG. 10, a cross section of the main magnetic plate 51, the first side magnetic plates 3 and the second side magnetic plates 4 in the widthwise direction of the main magnetic plate 51 may appear as an H-shaped arrangement.

Refer to FIG. 9 to FIG. 10. As shown in the drawings, a recessed limiting portion 14 may be provided at each of four end portions between the first speaker base 1 and the second speaker base 2, a protruding positioning portion 512 may be provided at each of four end portions of the main magnetic plate 51, and the positioning portions 512 are respectively disposed at the limiting portions 14, such that the magnetic member 5 is not in contact with or in contact with the first side magnetic plates 3 and the second side magnetic plates 4 to form a gap, further enhancing ventilation effects. Moreover, the first side magnetic plates 3 and the second side magnetic plates 4 do not extend into the limiting portions 14, and the main magnetic plate 51 is primarily assembled with the first speaker base 1 and the second speaker base 2 via the positioning portions 512 and the limiting portions 14. In addition, the first side magnetic plates 3 may also extend into the limiting portions 14 of the first speaker base 1 to enhance ease of assembly.

Figure 11:
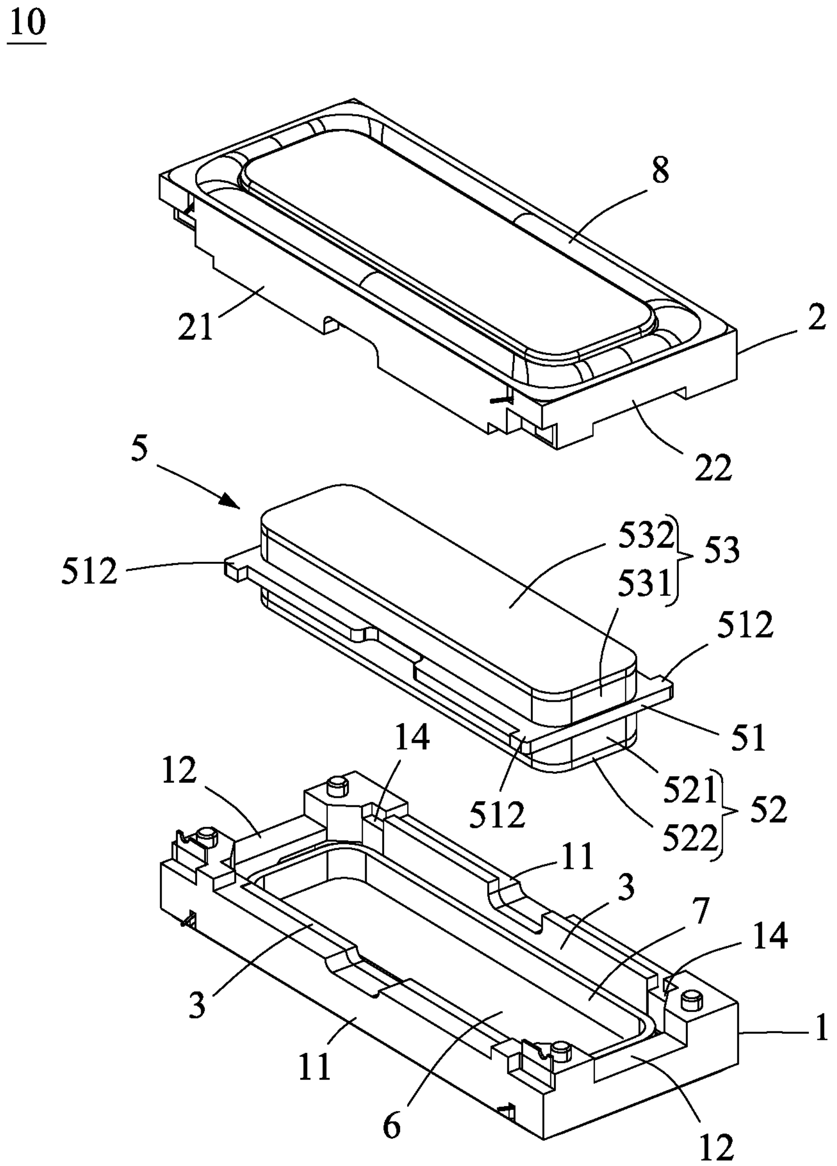
FIG. 11 is a first exploded schematic diagram of a double-sided loudspeaker according to a fourth embodiment of the present disclosure.
Figure 12:
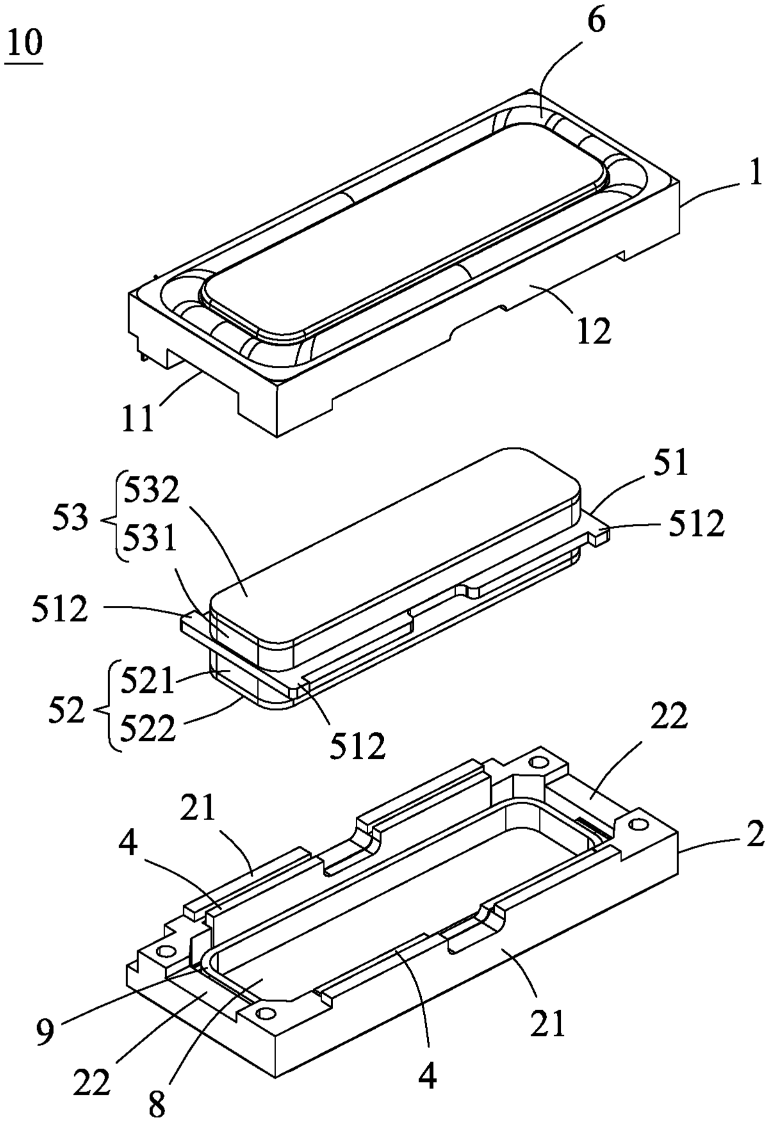
FIG. 12 is a second exploded schematic diagram of a double-sided loudspeaker according to the fourth embodiment of the present disclosure.
Figure 13:
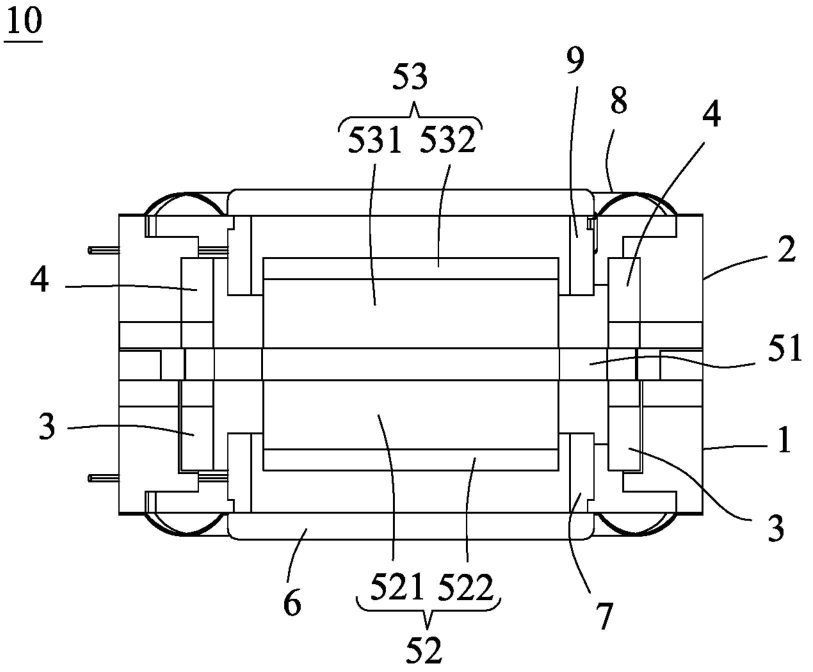
FIG. 13 is a cross-sectional schematic diagram of a double-sided loudspeaker according to the fourth embodiment of the present disclosure.

Refer to FIG. 11 to FIG. 13. As shown in the drawings, in addition to the above embodiments, in one embodiment of the present disclosure, the first lengthwise portions 11 of the first speaker base 1 may be respectively provided with the first side magnetic plates 3 by injection molding, one of the first side magnetic plates 3 may extend out of the first speaker base 1, the second lengthwise portions 21 of the second speaker base 2 may be respectively provided with the second side magnetic plates 4 by injection molding, one of the second side magnetic plates 4 may extend out of the second speaker base 2, the first side magnetic plates 3 are respectively correspondingly assembled at the second side magnetic plates 4, and the main magnetic plate 51 is not in contact with or is in contact with the first side magnetic plates 3 and the second side magnetic plates 4. Accordingly, the first side magnetic plate 3, the second side magnetic plate 4, the first speaker base 1 and the second speaker base 2 achieve an integral structure by means of injection molding, thereby enhancing an assembly yield rate of the double-sided loudspeaker 10 and reducing assembly hours and costs of the double-sided loudspeaker 10. In addition, the first side magnetic plates 3 may also extend into the limiting portions 14 of the first speaker base 1 to enhance ease of assembly. Moreover, as shown in FIG. 13, a cross section of the main magnetic plate 51, the first side magnetic plates 3 and the second side magnetic plates 4 in the widthwise direction of the main magnetic plate 51 appears as an H-shaped arrangement.

Figure 14:
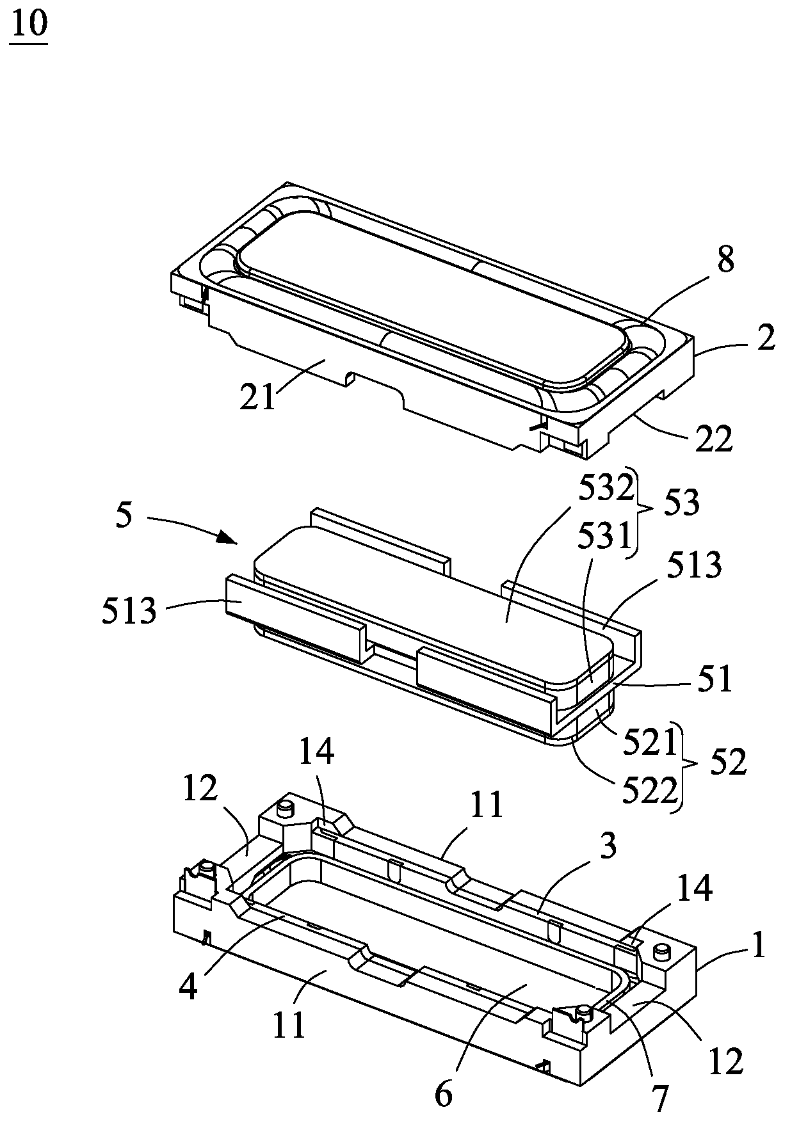
FIG. 14 is a first exploded schematic diagram of a double-sided loudspeaker according to a fifth embodiment of the present disclosure.
Figure 15:
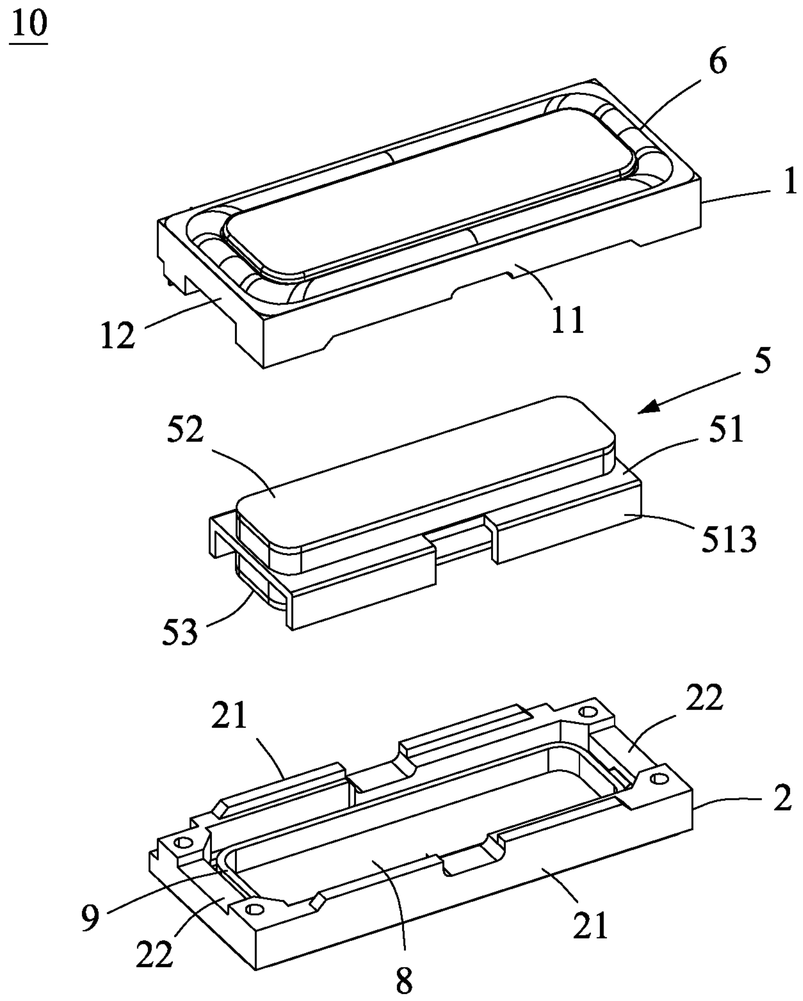
FIG. 15 is a second exploded schematic diagram of a double-sided loudspeaker according to the fifth embodiment of the present disclosure.
Figure 16:
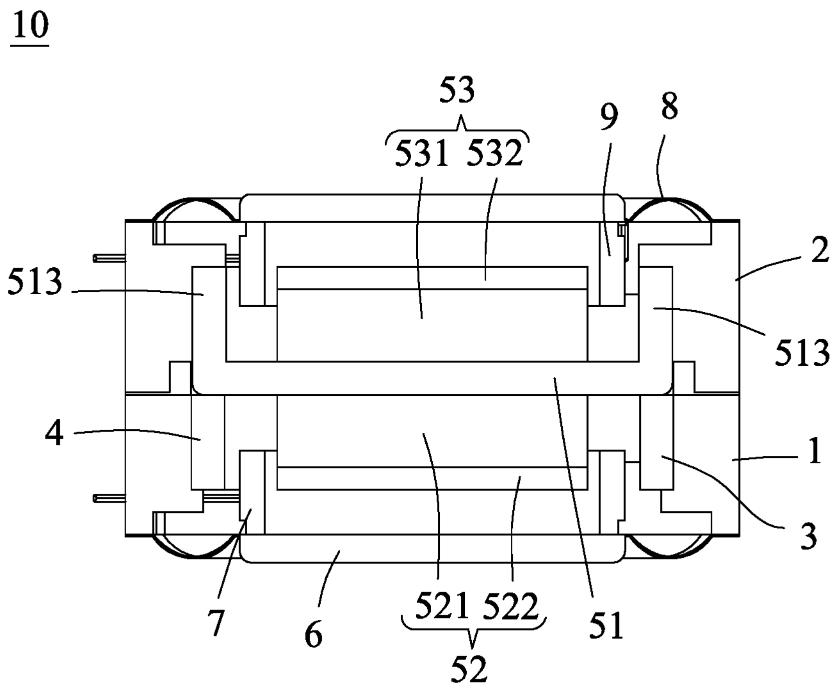
FIG. 16 is a cross-sectional schematic diagram of a double-sided loudspeaker according to the fifth embodiment of the present disclosure.

Refer to FIG. 14 to FIG. 16. As shown in the drawings, in addition to the above embodiments, in one embodiment of the present disclosure, the first side magnetic plate 3 and the second side magnetic plate 4 may be respectively disposed by means of injection molding at the first lengthwise portions 11 of the first speaker base 1, each of two sides of the main magnetic plate 51 may be provided with a bending side portion 513, and the bending side portions 513 bend toward a same direction and are respectively assembled at the second lengthwise portions 21 of the second speaker base 2, such that the first side magnetic plate 3 and the second side magnetic plate 4 are respectively in contact with or not in contact with the bending side portions 513. Accordingly, the first side magnetic plate 3, the second side magnetic plate 4, the first speaker base 1 and the second speaker base 2 achieve an integral structure by means of injection molding, thereby enhancing an assembly yield rate of the double-sided loudspeaker 10 and reducing assembly hours and costs of the double-sided loudspeaker 10. In addition, the first side magnetic plates 3 may also extend into the limiting portions 14 of the first speaker base 1 to enhance ease of assembly. Moreover, as shown in FIG. 16, a cross section of a body of the main magnetic plate 51, the bending side portions 513 of the main magnetic plate 51, the first side magnetic plate 3 and the second side magnetic plate 4 in the widthwise direction of the main magnetic plate 51 appears as an H-shaped arrangement.

Figure 17:
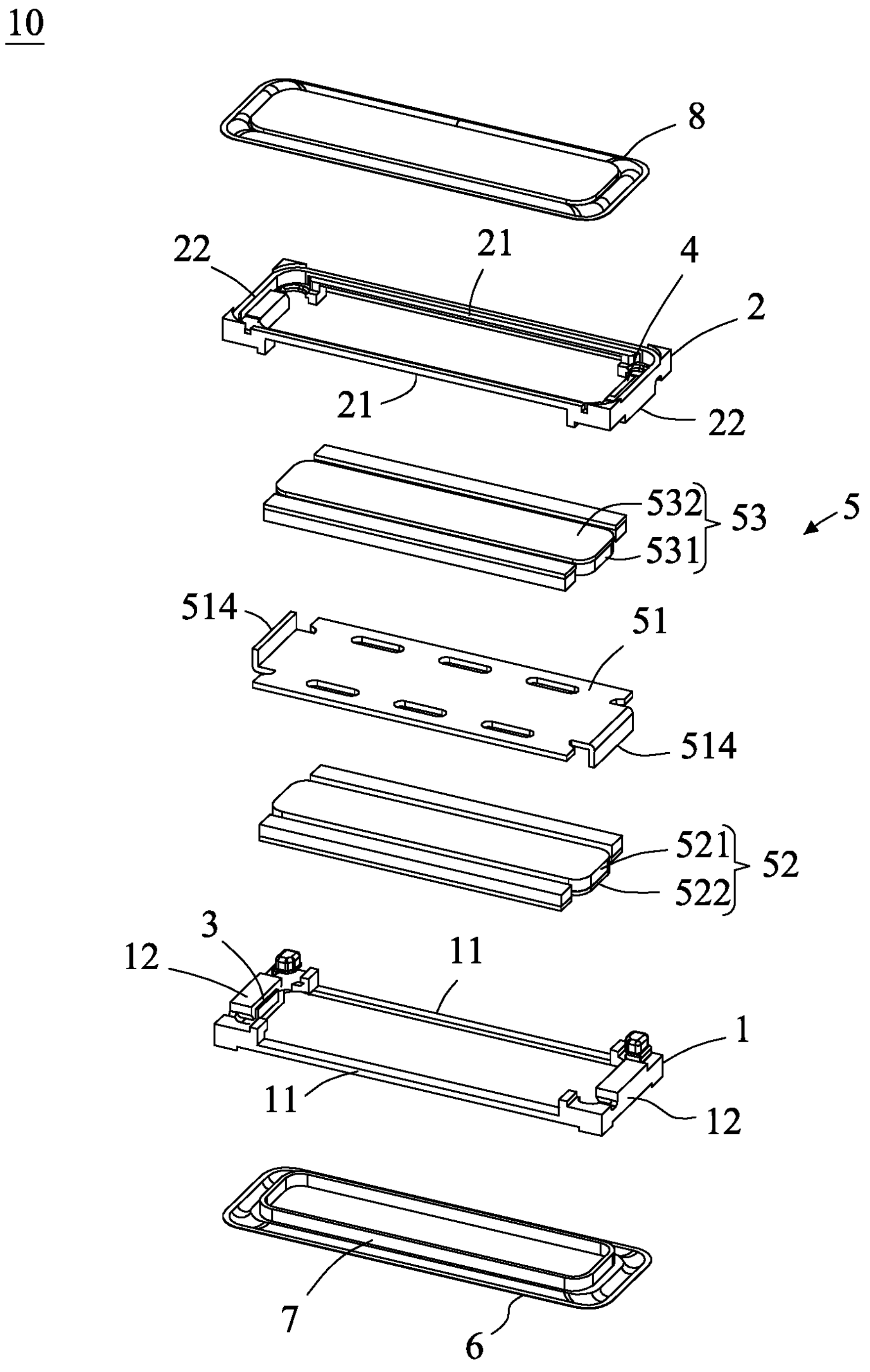
FIG. 17 is a first exploded schematic diagram of a double-sided loudspeaker according to a sixth embodiment of the present disclosure.
Figure 18:
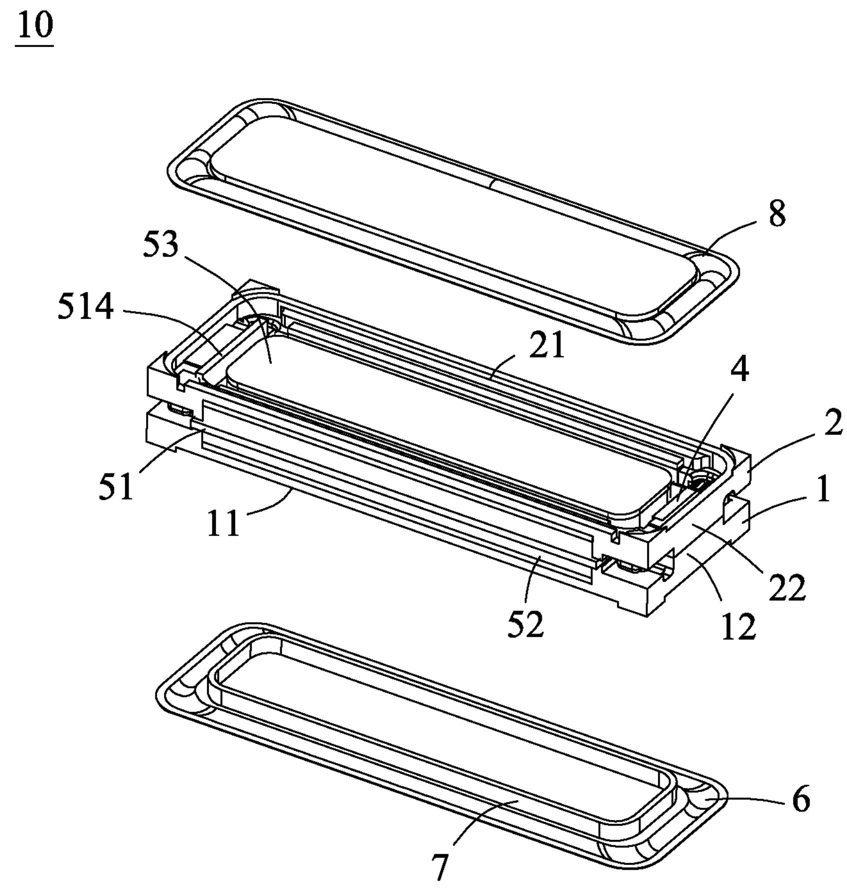
FIG. 18 is a second exploded schematic diagram of a double-sided loudspeaker according to the sixth embodiment of the present disclosure.
Figure 19:
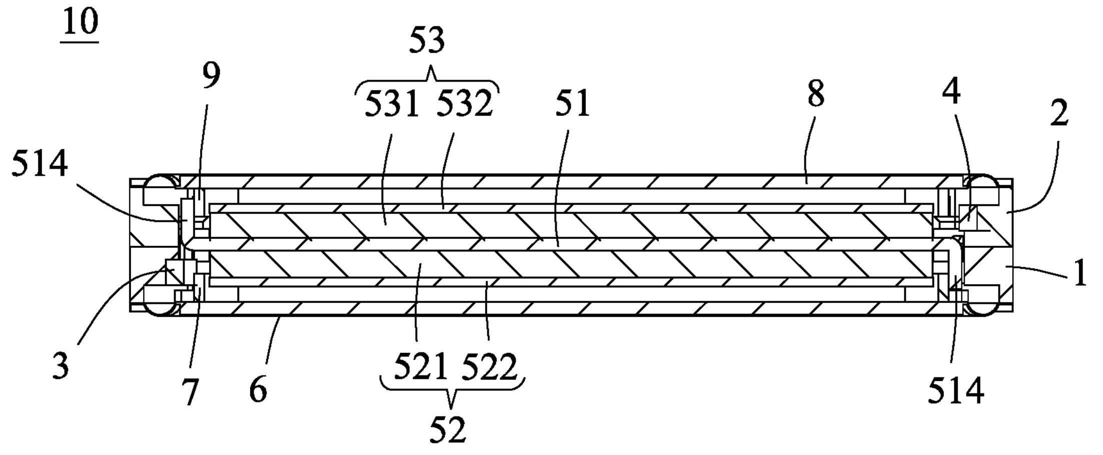
FIG. 19 is a cross-sectional schematic diagram of a double-sided loudspeaker according to the sixth embodiment of the present disclosure.

Refer to FIG. 17 to FIG. 19. As shown in the drawings, in addition to the above embodiments, in one embodiment of the present disclosure, the first side magnetic plate 3 may be disposed by means of injection molding (or by means of gluing or fastening) at one of the first widthwise portions 12 of the first speaker base 1, the second side magnetic plate 4 may be disposed by means of injection molding (or by means of gluing or fastening) at one of the second widthwise portions 22 of the second speaker base 2, each of two ends of the main magnetic plate 51 is provided with a bending end portion 514, and the bending end portions 514 bend toward different directions and are respectively assembled at the other first widthwise portion 12 and the other second widthwise portion 22. Accordingly, the first side magnetic plate 3, the second side magnetic plate 4, the first speaker base 1 and the second speaker base 2 achieve an integral structure by means of injection molding, thereby enhancing an assembly yield rate of the double-sided loudspeaker 10 and reducing assembly hours and costs of the double-sided loudspeaker 10.

Figure 20:
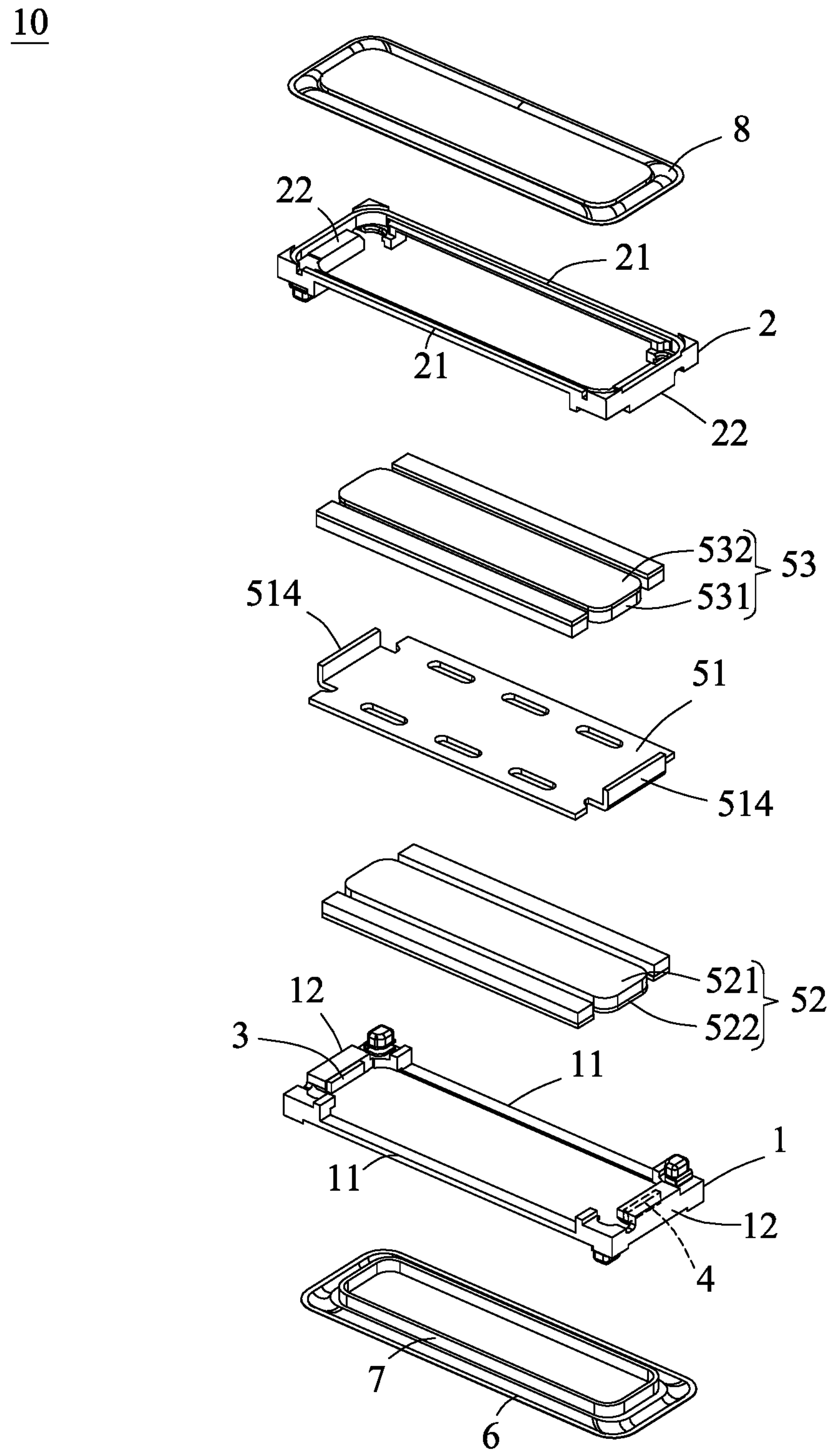
FIG. 20 is a first exploded schematic diagram of a double-sided loudspeaker according to a seventh embodiment of the present disclosure.
Figure 21:
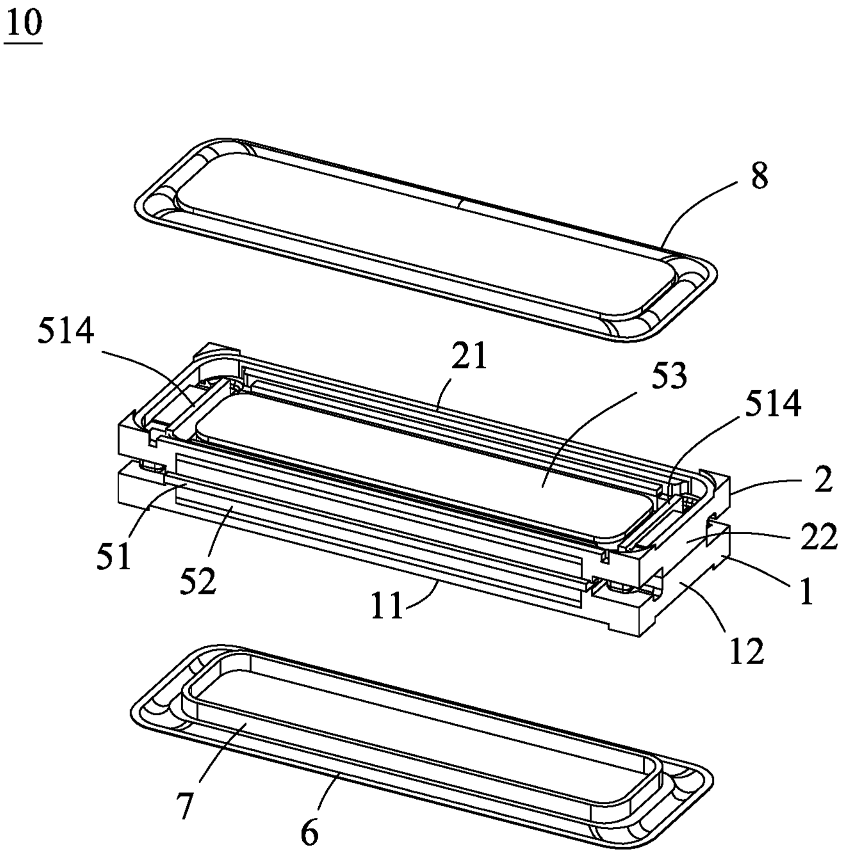
FIG. 21 is a second exploded schematic diagram of a double-sided loudspeaker according to the seventh embodiment of the present disclosure.
Figure 22:
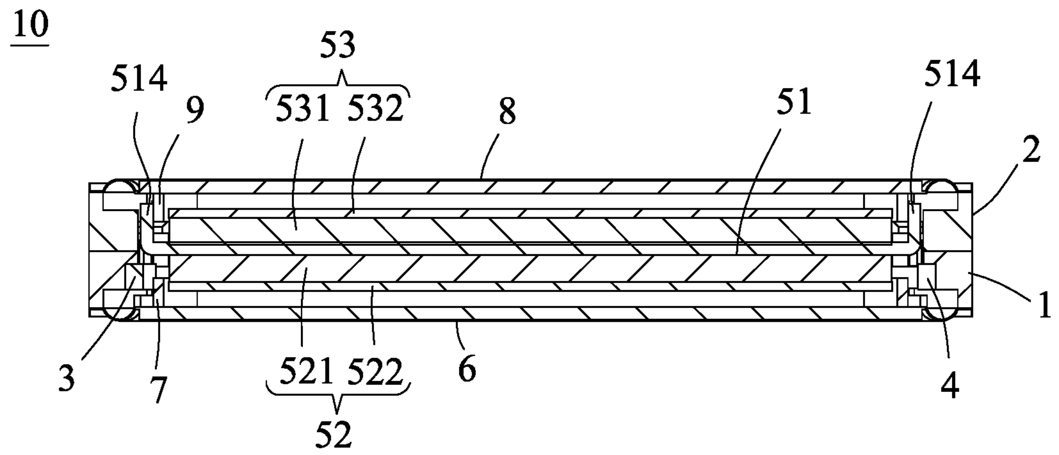
FIG. 22 is a cross-sectional schematic diagram of a double-sided loudspeaker according to the seventh embodiment of the present disclosure.

Refer to FIG. 20 to FIG. 22. As shown in the drawings, in addition to the above embodiments, in one embodiment of the present disclosure, the first side magnetic plate 3 and the second side magnetic plate 4 may be respectively disposed by means of injection molding (or by means of gluing or fastening) at the first widthwise portions 12 of the first speaker base 1, each of two ends of the main magnetic plate 51 is provided with a bending end portion 514, and the bending end portions 514 bend toward a same direction and are respectively assembled at the second widthwise portions 22 of the second speaker base 2. Accordingly, the first side magnetic plate 3, the second side magnetic plate 4, the first speaker base 1 and the second speaker base 2 achieve an integral structure by means of injection molding, thereby enhancing an assembly yield rate of the double-sided loudspeaker and reducing assembly hours and costs of the double-sided loudspeaker 10.

The present invention is disclosed by way of the preferred embodiments above. A person skilled in the art should understand that, these embodiments are merely for illustrating the present invention and are not to be construed as limitations to the scope of the present invention. It should be noted that all equivalent changes, replacements and substitutions made to the embodiments are encompassed within the scope of the present invention. Therefore, the scope of legal protection of the present invention should be defined by the appended claims.

What is claimed is:

1. A double-sided loudspeaker, comprising:

a first speaker base;

a second speaker base, assembled with the first speaker base, the first speaker base and the second speaker base provided with at least one ventilation hole in between;

at least one first side magnetic plate, injection molded at the first speaker base or the second speaker base;

at least one second side magnetic plate, injection molded at the first speaker base or the second speaker base;

a magnetic member, disposed between the first side magnetic plate and the second side magnetic plate, the magnetic member comprising a main magnetic plate, a first magnetic unit and a second magnetic unit, the first magnetic unit disposed on a surface of the main magnetic plate, the second magnetic unit disposed on another surface of the main magnetic plate;

a first diaphragm, disposed at the first speaker base;

a first voice coil, disposed at the first diaphragm and movably arranged at the first magnetic unit;

a second diaphragm, disposed at the second speaker base; and a second voice coil, disposed at the second diaphragm and movably arranged at the second magnetic unit;

wherein each of two sides of the first speaker base is provided with a first lengthwise portion, each of two ends of the first speaker base is provided with a first widthwise portion, each of two sides of the second speaker base is provided with a second lengthwise portion, each of two ends of the second speaker base is provided with a second widthwise portion, the first lengthwise portions are respectively assembled with the second lengthwise portions, and the first widthwise portions are respectively assembled with the second widthwise portions, and wherein the first lengthwise portions are respectively provided with the first side magnetic plates, one of the first side magnetic plates extends out of the first speaker base, the second lengthwise portions are respectively provided with the second side magnetic plates, one of the second side magnetic plates extends out of the second speaker base, and the first side magnetic plates are respectively correspondingly assembled at the second side magnetic plates.

2. The double-sided loudspeaker according to claim 1, wherein the first speaker base is provided with a plurality of assembly portions, the second speaker base is provided with a plurality of counterpart assembly portions, and the assembly portions are respectively assembled with the counterpart assembly portions.

3. The double-sided loudspeaker according to claim 1, wherein a cross section of the main magnetic plate, the first side magnetic plate and the second side magnetic plate appears as an H shape.

4. The double-sided loudspeaker according to claim 1, wherein each of the first side magnetic plate, the second side magnetic plate and the main magnetic plate is provided with an indentation in communication with the ventilation holes.

5. The double-sided loudspeaker according to claim 1, wherein the main magnetic plate is provided with a plurality of protruding positioning portions, the first speaker base or the second speaker base is provided with a plurality of recessed limiting portions, and the positioning portions are respectively coupled to the limiting portions such that the main magnetic plate is disposed between the first speaker base and the second speaker base.

6. A double-sided loudspeaker, comprising:

a first speaker base;

a second speaker base, assembled with the first speaker base, the first speaker base and the second speaker base provided with at least one ventilation hole in between;

at least one first side magnetic plate, injection molded at the first speaker base or the second speaker base;

at least one second side magnetic plate, injection molded at the first speaker base or the second speaker base;

a magnetic member, disposed between the first side magnetic plate and the second side magnetic plate, the magnetic member comprising a main magnetic plate, a first magnetic unit and a second magnetic unit, the first magnetic unit disposed on a surface of the main magnetic plate, the second magnetic unit disposed on another surface of the main magnetic plate;

a first diaphragm, disposed at the first speaker base;

a first voice coil, disposed at the first diaphragm and movably arranged at the first magnetic unit;

a second diaphragm, disposed at the second speaker base; and a second voice coil, disposed at the second diaphragm and movably arranged at the second magnetic unit;

wherein each of two sides of the first speaker base is provided with a first lengthwise portion, each of two ends of the first speaker base is provided with a first widthwise portion, each of two sides of the second speaker base is provided with a second lengthwise portion, each of two ends of the second speaker base is provided with a second widthwise portion, the first lengthwise portions are respectively assembled with the second lengthwise portions, and the first widthwise portions are respectively assembled with the second widthwise portions, and wherein the first side magnetic plate and the second side magnetic plate are respectively disposed at the first widthwise portions, each of two ends of the main magnetic plate is provided with a bending end portion, and the bending end portions bend toward a same direction and are respectively assembled at the second widthwise portions.

* * * * *